United States Patent
Fang et al.

(10) Patent No.: US 8,885,533 B2
(45) Date of Patent: Nov. 11, 2014

(54) ENHANCEMENT OF SLOTTED MODE OPERATION FOR WIRELESS COMMUNICATION

(75) Inventors: Yonggang Fang, San Diego, CA (US); YuanFang Yu, Shenzhen (CN); Ting Lu, Beijing (CN); Xiaowu Zhao, Shenzhen (CN)

(73) Assignees: ZTE Corporation, Shenzhen (CN); ZTE (USA) Inc., Morristown, NJ (US)

( * ) Notice: Subject to any disclaimer, the term of this patent is extended or adjusted under 35 U.S.C. 154(b) by 116 days.

(21) Appl. No.: 13/548,144

(22) Filed: Jul. 12, 2012

(65) Prior Publication Data

US 2013/0016640 A1    Jan. 17, 2013

(30) Foreign Application Priority Data

Jul. 13, 2011    (CN) .................. PCT/CN2011/077107

(51) Int. Cl.
*G08C 17/00*    (2006.01)
*H04W 52/02*    (2009.01)

(52) U.S. Cl.
CPC ...... *H04W 52/0216* (2013.01); *H04W 52/0229* (2013.01)
USPC ........................................................ 370/311

(58) Field of Classification Search
CPC ............ H04W 52/02; H04W 52/0209; H04W 52/016
USPC ........................................................ 370/311
See application file for complete search history.

(56) References Cited

U.S. PATENT DOCUMENTS

| | | | | |
|---|---|---|---|---|
| 5,905,443 | A * | 5/1999 | Olds et al. | 340/7.27 |
| 6,028,537 | A * | 2/2000 | Suman et al. | 340/988 |
| 8,213,933 | B2 * | 7/2012 | Lee | 455/434 |
| 8,265,661 | B2 * | 9/2012 | Chin et al. | 455/458 |
| 2008/0261628 | A1 * | 10/2008 | Proctor et al. | 455/458 |
| 2010/0159959 | A1 * | 6/2010 | Santhanam et al. | 455/458 |
| 2010/0202430 | A1 * | 8/2010 | Chin et al. | 370/342 |
| 2010/0279683 | A1 * | 11/2010 | Lee | 455/434 |
| 2011/0019602 | A1 * | 1/2011 | Park et al. | 370/311 |
| 2011/0103281 | A1 * | 5/2011 | Son et al. | 370/311 |
| 2011/0158342 | A1 * | 6/2011 | Srinivasan et al. | 375/285 |
| 2011/0195697 | A1 * | 8/2011 | Kim et al. | 455/418 |
| 2012/0059891 | A1 * | 3/2012 | Wen | 709/206 |
| 2012/0115552 | A1 * | 5/2012 | Bhattacharya | 455/574 |
| 2013/0229963 | A1 * | 9/2013 | Asterjadhi et al. | 370/311 |
| 2013/0235720 | A1 * | 9/2013 | Wang et al. | 370/229 |
| 2014/0011471 | A1 * | 1/2014 | Khosla et al. | 455/404.2 |
| 2014/0140208 | A1 * | 5/2014 | Cherian et al. | 370/230 |

FOREIGN PATENT DOCUMENTS

| | | |
|---|---|---|
| CN | 101873678 A | 10/2010 |
| WO | 95/12932 A1 | 5/1995 |
| WO | 2007/127940 A2 | 11/2007 |

OTHER PUBLICATIONS

Machine translation of Chinese Patent Publication No. CN101873678A, published on Oct. 27, 2010 (47 pages).

* cited by examiner

*Primary Examiner* — Farah Faroul
(74) *Attorney, Agent, or Firm* — Perkins Coie LLP

(57) ABSTRACT

Methods, apparatus and systems for enhanced slotted mode operation for wireless communication are disclosed. A first control message indicative of a first sleep cycle duration is received. When the first control message includes a first message field, a second control message that includes a second field indicative of a second sleep cycle duration that is greater than the first sleep cycle duration is transmitted.

19 Claims, 9 Drawing Sheets

ENHANCEMENT OF SLOTTED MODE OPERATION FOR WIRELESS COMMUNICATION

CROSS REFERENCE TO RELATED APPLICATIONS

This application claims the right of priority under 35 U.S.C. §119(a) and the Paris Convention of International Patent Application No. PCT/CN2011/077107, filed Jul. 13, 2011. The entire content of the before-mentioned patent application is incorporated by reference as part of the disclosure of this application.

BACKGROUND

This document relates to wireless communications.

Wireless communication systems can include a network of one or more base stations to communicate with one or more wireless devices such as a mobile device, cell phone, wireless air card, mobile station (MS), user equipment (UE), access terminal (AT), or subscriber station (SS). A base station can emit radio signals that carry data such as voice data and other service payload content to wireless devices. A base stations can be referred to as an access point (AP), access network (AN) or eNodeB, or can be included as part of an access network. Further, a wireless communication system can include one or more core networks to connect and control one or more base stations.

A wireless device can use one or more different wireless technologies for communications. Various wireless technologies examples include Code division Multiple Access (CDMA) such as CDMA2000 1x and High Rate Packet Data (HRPD), Long-Term Evolution (LTE), Worldwide Interoperability for Microwave Access (WiMAX), UMTS, etc. In some implementations, a wireless communication system can include multiple networks using different wireless technologies. Some wireless technologies allow a wireless device to sleep for a predetermined period to conserve battery power.

Wireless communications can be used for Machine to Machine (M2M) communications in various services, e.g., machine automation such as home automation, security and alarms systems, smart grid meter reading, traffic management and others. M2M communications can advantageously leverage wireless technologies to provide mobile M2M services. M2M system may benefit from techniques that prolong battery life.

SUMMARY

The techniques disclosed in this patent specification enable, among other things, increased battery life of a wireless device. The disclosed techniques can be used to, for example, enhance the slotted mode operation in wireless communication system. The enhanced slotted mode operation may be useful for special wireless applications, such as M2M, to improve the battery life of a wireless device by allowing longer sleep periods. The disclosed techniques include extending the slot cycle index in the system parameter message over forward link, and enabling different extended slot cycle index for individual wireless device in reverse link messages.

In one aspect, a method for wireless communication is disclosed. The method includes receiving a first control message indicative of a first sleep cycle duration; and communicating, when the first control message includes a first message field, a second control message that includes a second field indicative of a second sleep cycle duration that is greater than the first sleep cycle duration.

In another aspect, an apparatus for wireless communication is disclosed. The apparatus includes a module for receiving a first control message indicative of a first sleep cycle duration and a module for communicating, when the first control message includes a first message field, a second control message that includes a second field indicative of a second sleep cycle duration that is greater than the first sleep cycle duration.

In yet another aspect, a computer program product comprising a computer readable, non-volatile medium having instructions stored thereon is disclosed. The instructions comprise code for receiving a first control message indicative of a first sleep cycle duration, and code for communicating, when the first control message includes a first message field, a second control message that includes a second field indicative of a second sleep cycle duration that is greater than the first sleep cycle duration.

The details of the above aspects and others and their implementations are set forth in the accompanying drawings, the description and the claims.

DETAILED DESCRIPTION

This document describes techniques, devices, and systems for enhancement of slotted mode operation for battery operated wireless devices in wireless communication networks. The enhancement of slotted mode operation can be used for the wireless devices to extend their slot cycles with different length sleep periods for battery life expansion.

Figure 1:
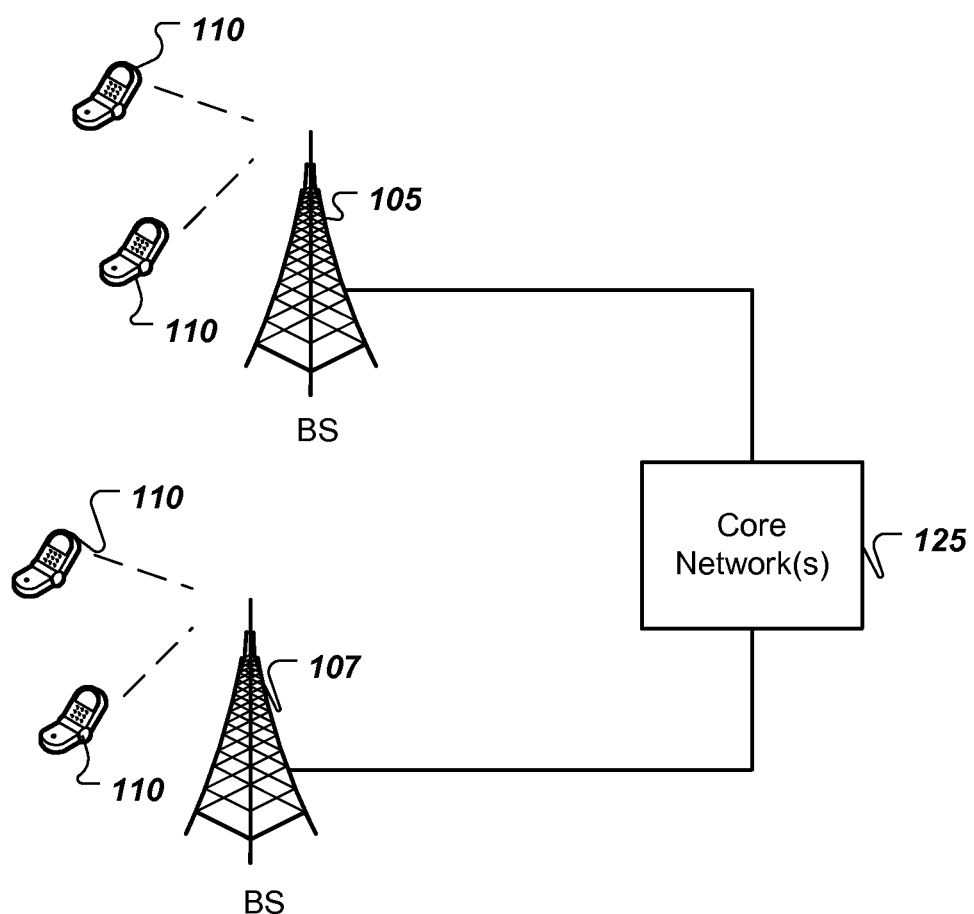
FIG. 1 shows an example of a wireless communication network.

FIG. 1 shows an example of a wireless communication network or system. This wireless communication network can include one or more base stations (BSs) 105, 107 and one or more wireless devices 110. A base station 105, 107 can transmit a signal on a forward link (FL), known as a downlink (DL) signal, to one or more wireless devices 110. A wireless device 110 can transmit a signal on a reverse link (RL), known as an uplink (UL) signal, to one or more base stations 105, 107. A wireless communication system can include one or more core networks 125 to connect and control one or more base stations 105, 107. One or more base stations form a radio access network. A base station, due to its nature of providing radio access for a wireless device, either alone or in combination with one or more other base stations, can be referred to as an access point (AP), an access network (AN) or eNodeB.

Examples of wireless communication systems that can implement the present techniques and systems include, among others, wireless communication systems based on Code division Multiple Access (CDMA) such as CDMA2000 1x, High Rate Packet Data (HRPD), Long-Term Evolution (LTE), Universal Terrestrial Radio Access Network (UTRAN), and Worldwide Interoperability for Microwave Access (WiMAX).

Figure 2:
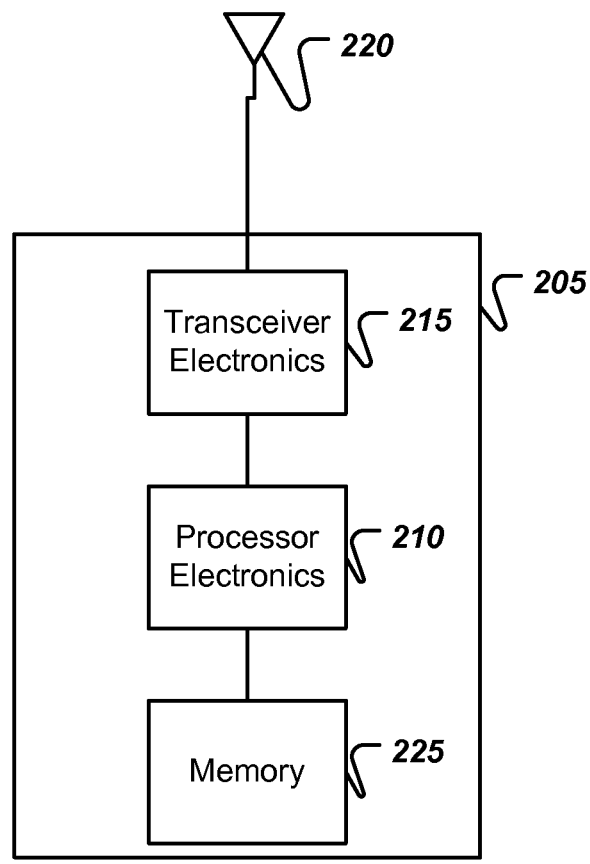
FIG. 2 shows an example of a radio transceiver station.

FIG. 2 shows an example of a radio transceiver station for implementing a wireless device, a base station or other wireless communication modules. Various examples of radio stations include base stations and wireless devices in FIG. 1. A radio station 205 such as a base station or a wireless device can include processor electronics 210 such as a microprocessor that implements methods such as one or more of the techniques presented in this document. A radio station 205 can include transceiver electronics 215 to send and/or receive wireless signals over one or more communication interfaces such as one or more antennas 220. A radio station 205 can include other communication interfaces for transmitting and receiving data. In some implementations, a radio station 205 can include one or more wired communication interfaces to communicate with a wired network. A radio station 205 can include one or more memories 225 configured to store information such as data and/or instructions. In some implementations, processor electronics 210 can include at least a portion of transceiver electronics 215 and a memory 225.

In some implementations, radio stations 205 can communicate with each other based on a CDMA air interface. In some implementations, radio stations 205 can communicate with each other based on an orthogonal frequency-division multiplexing (OFDM) air interface which can include Orthogonal Frequency-Division Multiple Access (OFDMA) air interface. In some implementations, radio stations 205 can communicate using one or more wireless technologies such as CDMA such as CDMA2000 1x, HRPD, WiMAX, LTE, and Universal Mobile Telecommunications System (UMTS).

In some current wireless communication systems, the slotted mode operation is a technique used to extend a wireless device's battery life. In the slotted mode operation, the transmission time may be divided into slot cycles. Each slot cycle may contain a sleep period and a wake period. During the sleep period, a wireless device may turn off its radio components in order to save battery life. Therefore the wireless device cannot receive and transmit any signal from and to the wireless network. On the network side, since the wireless device is in the sleep mode, the base station may not transmit any dedicated signal to the wireless device. During the wake period, the wireless device may turn on its radio for normal operation. In this mode, the wireless device can receive and transmit signal from and to the base station. The base station can also communicate with the wireless device in this wake period. In some implementations, in order to distribute network load evenly, different wireless devices may have different wake times so that different wireless devices may be awake and communicating in the wireless network in different time slots.

In order to make the timing of the slotted mode operation work accurately, a wireless device may have to be synchronized with the wireless network in the time domain. To enable synchronization, the timing characteristics of the slotted mode operation may be predefined in certain wireless communication systems. For example, in the CDMA2000 system, transmissions in the paging channel may be divided into 16 paging slots in the minimum slot cycle (1.28 seconds). Each paging slot may contain four physical frames and may have 80 ms duration. The paging slot is identified by the SLOT_NUM which may be calculated by $$\text{SLOT\_NUM} = \text{Floor}[t/4 \bmod 2048] \quad \text{Equation (1)}$$

where t is the system time in frames.

In certain wireless systems, a base station may broadcast the system time information and slot cycle information to all wireless devices. When a wireless device receives the timing information, the wireless device can synchronize with the wireless network and communicate using the slotted mode operation.

In the slotted mode operation, the slot cycle length is controlled by the slot cycle index. The duration of the slot cycle, T, in units of 1.28 seconds, is given by $$T = 2^i \quad \text{Equation (2)}$$

where i is the slot cycle index. Each slot cycle may contain 16×T paging slots. The first paging slot of each paging slot cycle may be any paging channel slot in which [t/4 mod (16×T)]=0, where t represents system time in frames.

In a CDMA2000 network, the base station broadcasts the maximum slot cycle index (MAX_SLOT_CYCLE_INDEX) in the System Parameter message (SPM). The value MAX_SLOT_CYCLE_INDEX represents the maximum value of slot cycle allowed by the base station. The bit width of this field may be predetermined and known to base stations and wireless devices. For example, in CDMA2000, the MAX_SLOT_CYCLE_INDEX is a 3 bit long field in the SPM.

In some embodiments, a wireless device may choose its preferred slot cycle index and notify to the network (e.g., a base station) of the preferred slot cycle index value in the SLOT_CYCLE_INDEXp of the Registration, Origination or Page Response messages.

In CDMA2000, a wireless device can set the slot cycle index in use to the smaller value between preferred slot cycle index SLOT_CYCLE_INDEXp and the maximum slot cycle index MAX_SLOT_CYCLE_INDEX, and stores in the SLOT_CYCLE_INDEXs. As an example, when the maximum slot cycle index value is 7 (3 bits representation), using Equation (2), T=128, and therefore the maximum possible value for the slot cycle length may be about 164 seconds.

In other words, certain current wireless systems such as CDMA2000 require that the wireless device be awake at least once every 164 seconds. This restriction may cause issues for battery operated wireless devices in some applications where a much longer slot cycle duration (e.g., of the order of days or a month) may be acceptable.

While a high value operational slot cycle index setting may help to improve the battery life of wireless devices, it may affect the page response time due to longer sleep durations. A larger slot cycle index may typically create a longer page response time. As an example, in some CDMA2000 networks, the value of MAX_SLOT_CYCLE_INDEX may be set to "2" and indicated in the SPM in order to balance the paging response time and wireless device's battery life. Therefore regardless of what a wireless device chooses to be its preferred slot cycle index, the wireless device may have to wake up every 5.12 seconds to listen to the broadcast information from base stations. In some M2M services, an application may only need the wireless device to wake up to transmit or receive data every few days. Such longer sleep cycles may not be possible due to the limitation on number of bits used for slot cycle index. The small range of slot cycle index in some current wireless networks makes it impossible to set a longer sleep period. This forces the wireless device to wake up too often and reduce its battery life.

Therefore there is a need to extend the existing maximum slot cycle index value and to give more flexibility to the wireless device to choose the preferred slot cycle index value. In addition, since the new wireless devices with extended slotted cycle index have to co-exist with legacy wireless devices in the same wireless network, the slot cycle index expansion may be backward compatible with legacy slotted mode operation.

The slot cycle index field may be expanded by either modifying an existing message to add a new field and/or by defining a new broadcast message to include a new field indicating larger values of slot cycle indices.

For example. In some embodiments, the existing messages for wireless devices and base stations may be modified for extended slotted mode operation.

In some designs, a new field of EXT_MAX_SLOT_CYCLE_INDEX may be included in the System Parameter Message (SPM). In some designs, a new field EXT_SLOT_CYCLE_INDEX may be included in the Registration Message, Origination Message and Page Response Message to extend the slot cycle index.

With reference to Table 1, an example of an SPM that includes the EXT_MAX_SLOT_CYCLE_INDEX field is shown. The "Field" column lists some fields of the SPM and the column "Length" gives bit width of each message field. As can be seen from Table 1, the new field EXT_MAX_SLOT_CYCLE_INDEX has been added at the end of the remaining fields defined for the SPM message.

TABLE 1

Example of SPM with EXT_MAX_SLOT_CYCLE_INDEX

| Field | Length (bits) |
| --- | --- |
| PILOT_PN | 9 |
| CONFIG_MSG_SEQ | 6 |
| ... | |
| ATIM_IND | 0 or 1 |
| ... | |
| LOC_UNC_V | 0 or 4 |
| ADD_LOC_GEM_ALLOWED | 0 or 1 |
| EXT_MAX_SLOT_CYCLE_INDEX | 0 or 21 |

The base station that supports extended slot cycles may broadcast the SPM periodically over the paging channel or forward link control channel to the wireless devices to indicate the extended maximum slot cycle index it supports. Otherwise if a base station does not support extended slot cycles (e.g., legacy base station), then the additional field EXT_MAX_SLOT_CYCLE_INDEX is not included in the SPM message (i.e., the corresponding field has a zero bit width).

When a legacy or an enhanced wireless device receives a legacy SPM message, the slot cycle operation may proceed as previously described. When a legacy wireless device receives the new SPM (e.g. as shown in Table 2), because the new field is included after the bits of the fields that the legacy field understands, the legacy wireless device may ignore the new field of EXT_MAX_SLOT_CYCLE_INDEX. When an enhanced wireless device that supports EXT_MAX_SLOT_CYCLE_INDEX, receives an SPM message in the new format (Table 2), then the wireless device may decode this field of SPM and use this value in place of the value indicated in the field of MAX_SLOT_CYCLE_INDEX.

It may be seen that the new extended slot cycle index field is 21 bits long, meaning that a slot cycle up to 31 days can be represented by this field. In different embodiments, a different number of bits may be used, the bit width being known a priori to the base station and the wireless device.

With reference to Table 2, an example of Registration Message with EXT_SLOT_CYCLE_INDEX is shown.

TABLE 2

Enhanced Registration Message

| Field | Length (bits) |
| --- | --- |
| REG_TYPE | 4 |
| SLOT_CYCLE_INDEX | 3 |
| ... | |
| ADD_GEO_LOC_INCL | |
| ADD_GEO_LOC_TYPE_LEN_IND | 0 or 1 |
| ADD_GEO_LOC_TYPE | 0 or 1 |
| EXT_SLOT_CYCLE_INDEX_INCL | 0 or 1 |
| EXT_SLOT_CYCLE_INDEX | 0 or 21 |

Table 2 shows an example of modifying an existing Registration message to extend the preferred slot cycle index of wireless device. When the wireless device receives an SPM which indicates support of extended slot cycle index (e.g., as shown in Table 1), the wireless device may set the field of EXT_SLOT_CYCLE_INDEX_INCL in Origination, Registration or Page Response message to the value "1" to indicate that the wireless device supports the extended slot cycle mode. When the field of EXT_SLOT_CYCLE_INDEX_INCL is set to "1", the wireless device may also include the field of EXT_SLOT_CYCLE_INDEX in the same Origination, Registration or Page Response messages. Otherwise, if the wireless device does not receive an SPM which indicates support of extended slot cycle index, or if the wireless device does not support extended slot cycle mode operation, it may set the field of EXT_SLOT_CYCLE_INDEX_INCL to "0" or omit this field. If the field of EXT_SLOT_CYCLE_INDEX_INCL is set to "0" or omitted, the wireless device may omit the EXT_SLOT_CYCLE_INDEX field.

As previously discussed, a 21 bit extended preferred slot cycle index field may correspond to a cycle time of up to 31 days. This sleep period may be useful in applications such as utility meter reading where a wireless device may desire to sleep for about a month between monthly usage reporting. In some embodiments, a different number of bits may be used to represent the slot cycle index field, based on the desired maximum sleep duration.

From a base station's perspective, when the base station receives the EXT_SLOT_CYCLE_INDEX field, the value in this field may replace the SLOT_CYCLE_INDEXp value in the slot cycle index determination algorithm. In other words, the wireless device and the base station may set the slot cycle index in use to the smaller value between extended preferred slot cycle index EXT_SLOT_CYCLE_INDEX and the extended maximum slot cycle index EXT_MAX_SLOT_CYCLE_INDEX. The new slot cycle index setting may be stored in the SLOT_CYCLE_INDEXs in the wireless device.

Using the new SLOT_CYCLE_INDEXs value, the wireless device may wake up periodically at the slot cycle T determined by the new SLOT_CYCLE_INDEXs as shown in Equation (3).

$$T = 2^{SLOT\_CYCLE\_INDEXs}$$ Equation (3)

As previously discussed, each slot cycle may contain 16×T paging slots. The first paging slot of each paging cycle may be any paging channel slot in which [t/4 mod (16×T)]=0, where t represents system time in frames.

The paging slot number PGSLOT in which the wireless device wakes up may be determined by the hash function using a unique number associated with the wireless device, e.g., a wireless device's international mobile subscriber identification (IMSI):

$$R=\text{floor}[N\times((40503\times(L\oplus H\oplus DECORR))\bmod 2^{16})/2^{16}]$$  Equation (4)

Where L is bits 0-15 of HASH_KEY.
H is bits 16-31 of HASH_KEY.
HASH_KEY is the 32 least significant bits of IMSI_O_S1+224×IMSI_O_S2).
N is the number of paging slots in a slot cycle.
DECORR is the decorrelation value.

On the network side, a base station can page the wireless device with the extended slot cycle index in the regular page slots. Since the extended slot cycle index could be much longer than the regular slot cycle index, therefore it could generate a lot of missed page messages and impact the system key performance index.

To improve the paging performance, an enhanced paging approach may be implemented as follows. In some embodiments, the mobile switching center (MSC) and/or base station subsystem, BSS, including a base station controller (BSC) and one or more base transceiver stations BTSs, store the values of EXT_MAX_SLOT_CYCLE_INDEX and EXT_SLOT_CYCLE_INDEXp for each wireless device in the network. The MSC may send a Page Request message to the BSS to page a particular wireless device. If the Page Request message arrives within a certain time before that the wireless device wakes up, the BSS shall buffer this Page Request message and send an acknowledgement to the sender to indicate the deferred page will be sent to the wireless device later. When it is the time for the wireless device to wake up, the BSS will send the buffered Page Message to the wireless device over the air link. If the Page message arrives too early before the wireless device wakes up, the BSS shall not buffer the Page Message and send an acknowledgement message to the sender to re-send it at later proper time.

Figure 3:
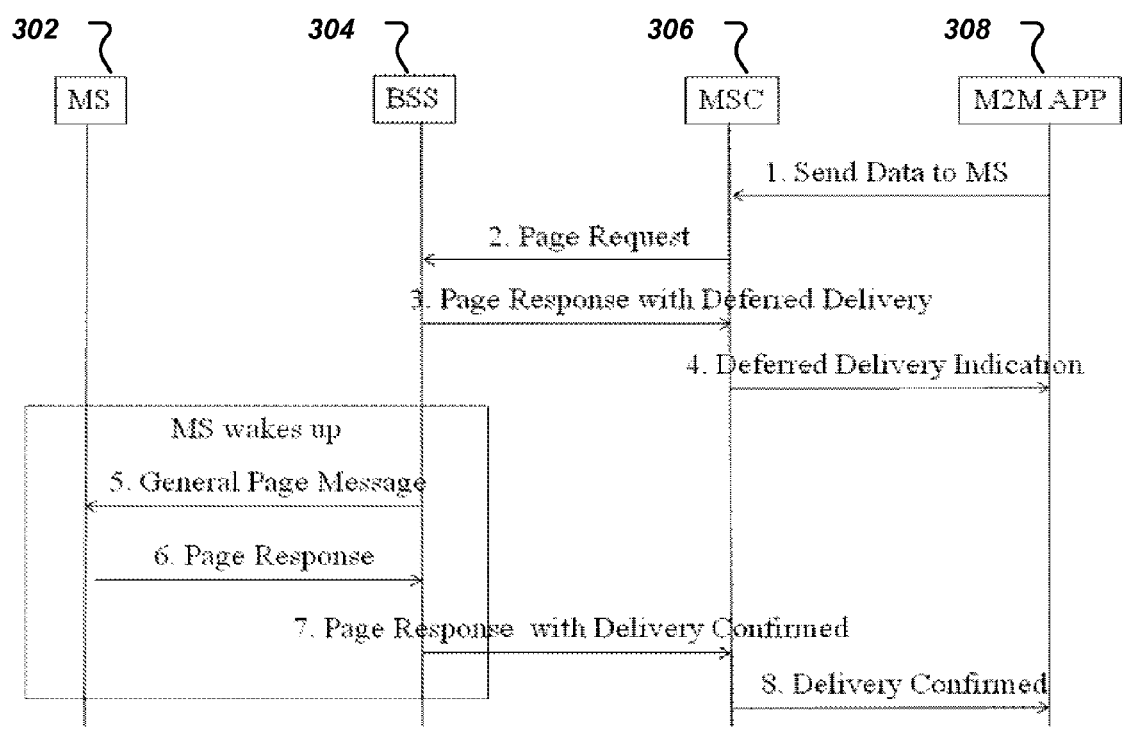
FIG. 3 shows an example of Registration Message with EXT_SLOT_CYCLE_INDEX

FIG. 3 shows an example of call flow that the network pages a wireless device with the extended slot cycle index. The M2M application server 308 sends a data to the wireless device or mobile station (MS) 302 through a MSC 306. The MSC 306 may send a Page Request message to a BSS 304 which the wireless device is attached. The BSS calculates the page slot of this wireless device. If the waking time of this wireless device is within a given interval, the BSS buffers the Page Message and sends a Deferred Delivery Indication to the MSC. The MSC relays this message to the M2M Application Server. When it is for the wireless device to wake up, the BSS will then send a General Page Message to the wireless device. If this message is received, the wireless device sends a Page Response Message to the BSS. The BSS then sends a Page Response with delivery confirmed to the MSC. The MSC forwards it to the M2M Application Server.

Figure 4:
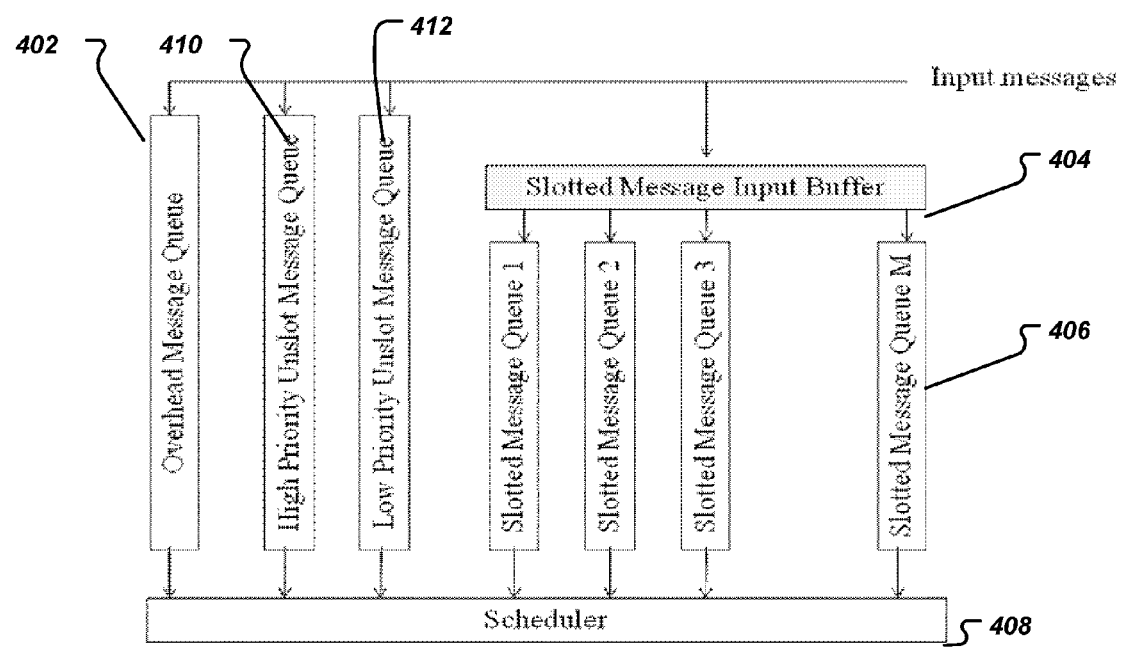
FIG. 4 shows an example of Registration Message with EXT_SLOT_CYCLE_INDEX

With reference to FIG. 4, the paging channel scheduling mechanism may include the overhead message queue 402, high priority un-slotted message queue 410 which is used to store high priority messages, low priority un-slotted message queue 412, and one or more slotted message queues 406. In each paging slot, the paging channel scheduler picks up the messages from the overhead message queue, high priority messages queue, low priority un-slotted message queue, and one of slotted message queues (according to the paging slot number) for transmission. If the paging channel payload can hold all the messages, these messages are transmitted in the current paging channel slot. Otherwise, the lower priority messages could be deferred transmission in the next one or more slots.

The number of slotted message queues depends on the value of slot cycle index. If the slot cycle index value is small, the number of slotted message queues would be small, such as 16, 32 or 64. However, when the slot cycle index is extended to a large number, there might be a huge number of slotted message queues, which may not be feasible in the implementation. In order to solve this, the slotted message could be first temporarily buffered in the slotted message input buffer 404 according to its scheduled transmit time. The input buffer could be implemented using the linked list so that any input message could be inserted into the right position of the buffer in the order of transmit time easily.

When a BSS needs to buffer a Page Message, it first stores the message in the Slotted Message Input Buffer in the position according to the transmit time. The earlier the transmit time, the more front it is in the buffer. When the paging channel scheduler completes the scheduling the paging channel message transmission, it could invoke a software to check the messages in the Slotted Message Input Buffer. If there are some messages to be transmitted in the next M paging slots, the software shall transfer those messages into the slotted message queues. Therefore with this Slotted Message Input Buffer, the existing slotted message queues could still be used to store messages for scheduled transmission by the paging channel scheduler.

Figure 5:
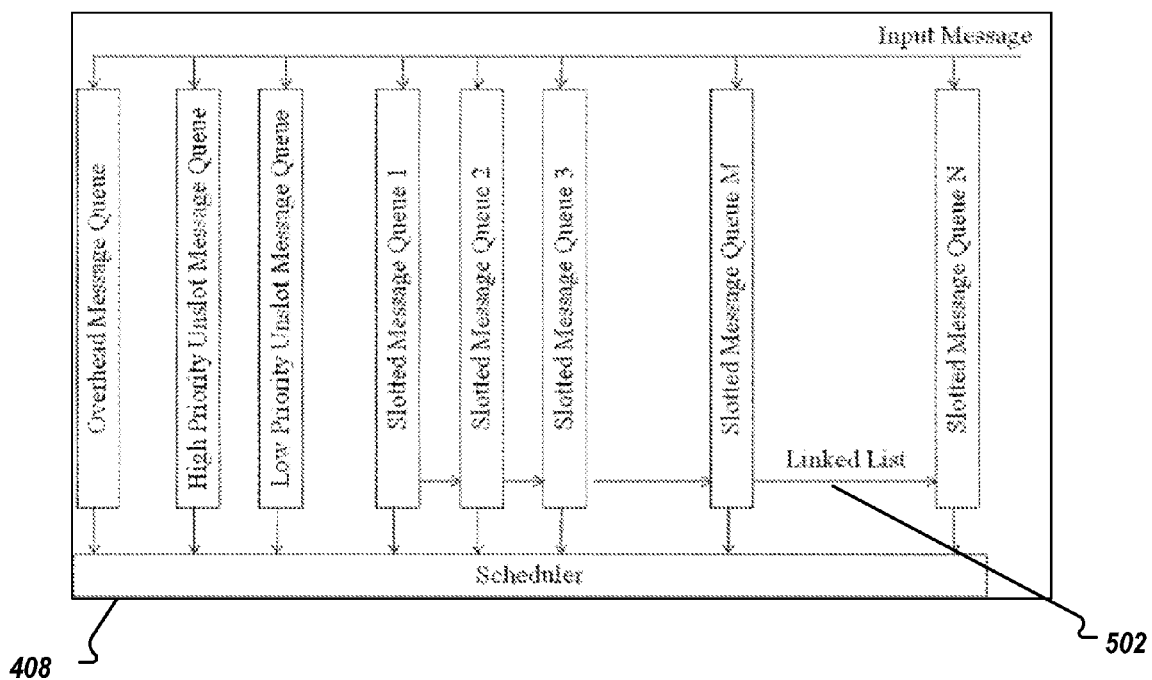
FIG. 5 shows an example of call flow that the network pages a wireless device with the extended slot cycle index.

FIG. 5 shows an example of slotted message queues implemented with the linked list 502. The slotted message queues may be created dynamically according to the page messages to be transmitted at the paging slot numbers. When BSS receives a page message to be transmitted at the paging slot M, a module on BSS checks whether there is a slotted message queue for the paging slot M. If one exists, the module may put the page message into the slotted message queue M. Otherwise, a slotted message queue M may be created first and then the page message may be queued into the new created message queue M.

In some embodiments, each slotted message queue may be associated with a paging slot and all the slotted paging messages for that paging slot may be put into that queue. All the slotted message queues may be linked together via the double links according to the order of paging numbers. If there is no message to be transmitted at a given paging number, the slotted message queue for that paging number may not removed from the linked message queues. In this way, the slotted message queues may be managed efficiently to avoid of huge empty of queues due to a large value of slot cycle index.

Figure 6:
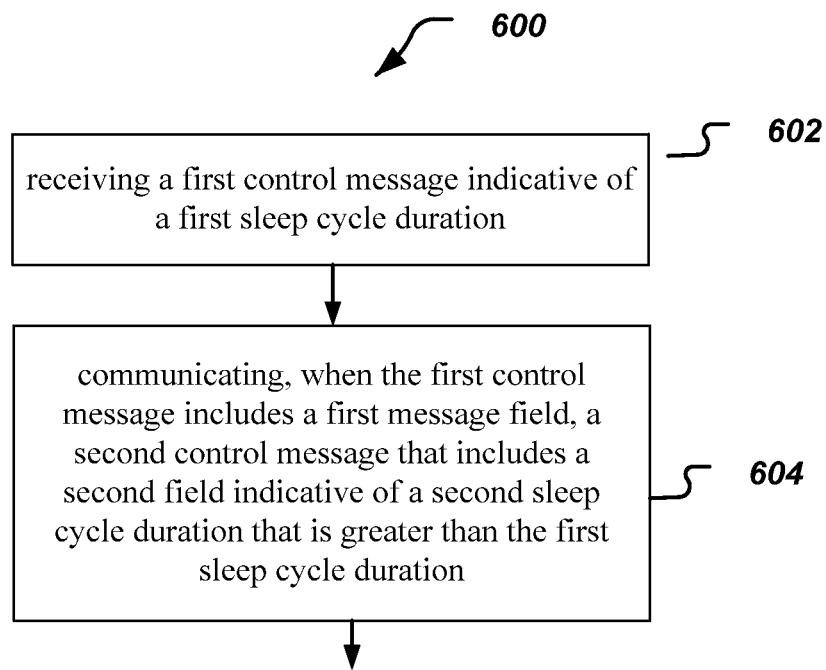
FIG. 6 is a flow chart representation of a process of wireless communication, implementable at a wireless device.

FIG. 6 is a flow chart representation of a process 600 of wireless communication. The process 600 may be implemented, e.g., at a wireless device. At 602, a first control message indicative of a first sleep cycle duration may be received. At 604, when the first control message includes a first message field, a second control message that includes a second field indicative of a second sleep cycle duration that is greater than the first sleep cycle duration is communicated.

Figure 7:
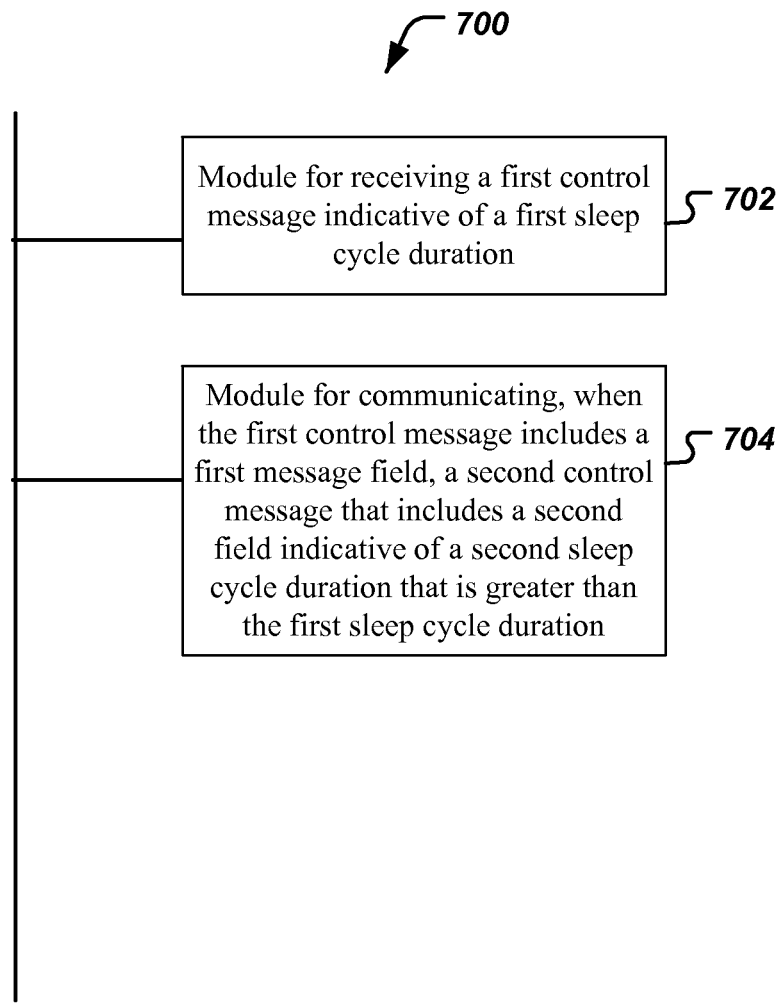
FIG. 7 is a block diagram representation of a portion of an apparatus for wireless communication.

FIG. 7 is a block diagram representation of an apparatus 700 for wireless communication. The module 702 is for receiving a first control message indicative of a first sleep cycle duration. The module 704 is for communicating, when the first control message includes a first message field, a second control message that includes a second field indicative of a second sleep cycle duration that is greater than the first sleep cycle duration. The apparatus 700 and modules 702, 704 may further be configured to implement other techniques disclosed in this patent specification.

Figure 8:
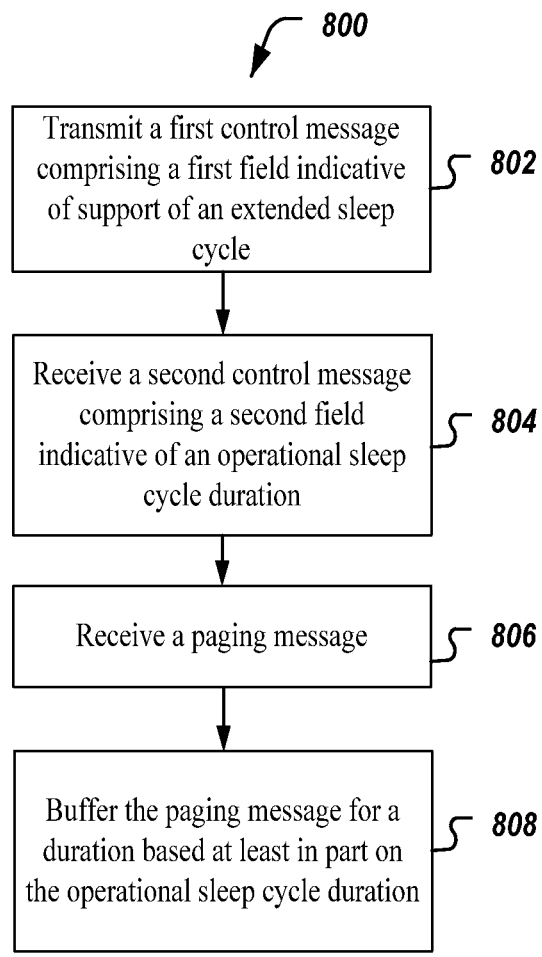
FIG. 8 is a flow chart representation of a process of wireless communication, implementable at a base station.

FIG. 8 is a flow chart representation of a process 800 of wireless communication. The process 800 may be implemented, e.g., at a base station in a wireless network. At 802, a first control message comprising a first field indicative of support of an extended sleep cycle is transmitted. At 804, a second control message comprising a second field indicative of an operational sleep cycle duration is received. At 806, a paging message is received. At 808, the paging message is buffered for a duration based at least in part on the operational sleep cycle duration.

Figure 9:
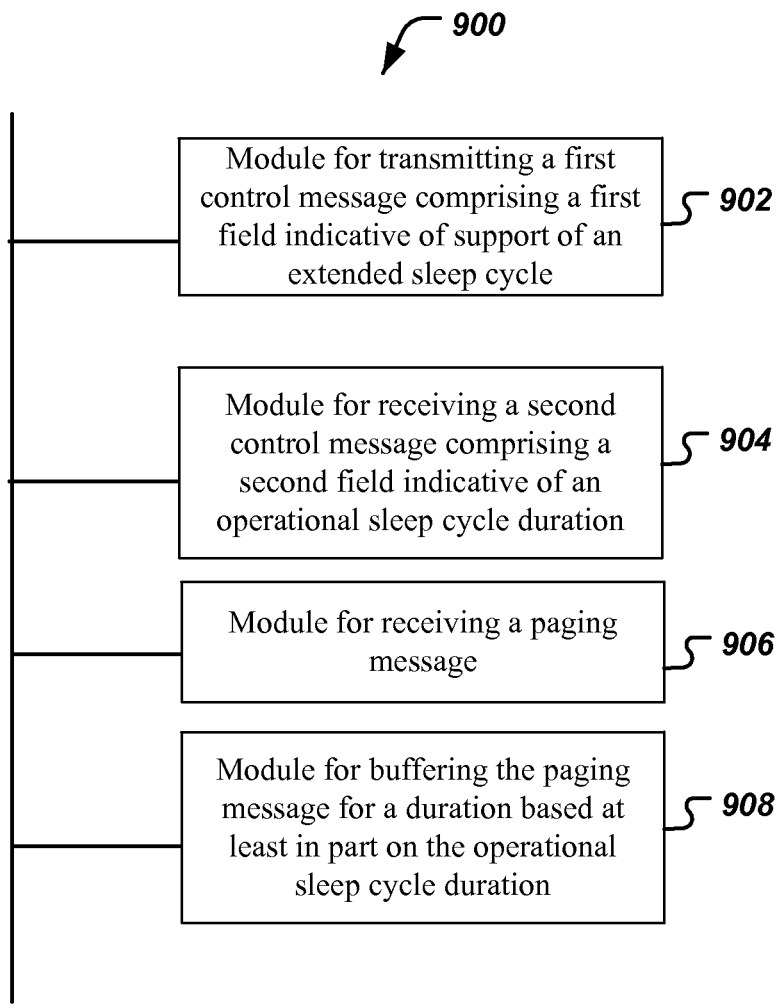
FIG. 9 is a block diagram representation of a portion of an apparatus for wireless communication.

FIG. 9 is a block diagram representation of a portion of a wireless communication apparatus 900. The module 902 is for transmitting a first control message comprising a first field indicative of support of an extended sleep cycle. The module 904 is for receiving a second control message comprising a second field indicative of an operational sleep cycle duration. The module 906 is for receiving a paging message. The module 908 is for buffering the paging message for a duration based at least in part on the operational sleep cycle duration. The apparatus 900 and modules 902, 904, 906 and 908 may further be configured to implement other techniques disclosed in this patent specification.

It will be appreciated that techniques for enhanced slotted mode operation for wireless communication are disclosed. The disclosed techniques may be used, in one aspect, for extending sleep cycle of wireless devices in M2M communication.

It will further be appreciated that techniques are disclosed for efficient management of slotted message queues in a wireless communication apparatus. In addition, a wireless device can select its extended preferred slot cycle index which could be different from others. Furthermore a method for a wireless device to select and indicate its preferred extended slot cycle index to the network is provided to include a new field of the existing Registration Message, Origination Message or Page Response Message.

In yet another aspect, a method for the wireless network to page a wireless device with the extended slot cycle operation is provided.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is what is described and illustrated, including:

1. A method of configuring a wireless network and a wireless device for:
   receiving, at the wireless device, a first control message indicative of support of an extended sleep cycle duration that is greater than an existing sleep cycle duration that is currently in use; and
   sending, in response to the receiving, by the wireless device, a second control message that includes an extended preferred sleep cycle duration that is greater than the existing sleep cycle duration for use in communications in place of the existing sleep cycle duration.

2. The method of claim 1, wherein the first control message comprises a system parameter message (SPM).

3. The method of claim 1, wherein the second control message comprises one of a Registration Message, an Origination Message and a Page Response Message.

4. A wireless communication apparatus, comprising:
   means for receiving a first control message indicative of support of an extended sleep cycle duration that is greater than an existing sleep cycle duration; and
   means for sending, in response to the first control message, a second control message that includes an extended preferred sleep cycle duration that is greater than the existing sleep cycle duration for use in communications in place of the existing sleep cycle.

5. A computer program product comprising a non-transitory computer readable, non-volatile medium having instructions stored thereon, the instructions comprising:
   code for receiving a first control message indicative of support of an extended sleep cycle duration that is greater than an existing sleep cycle duration; and
   code for sending, in response to the first control message, a second control message that includes an extended preferred sleep cycle duration that is greater than the existing sleep cycle duration for use in communications in place of the existing sleep cycle duration.

6. A method of configuring a wireless network and a wireless device for:
   transmitting a first control message comprising a first field indicative of support of an extended sleep cycle duration that is greater than an existing sleep cycle duration;
   receiving a second control message comprising a second field indicative of an operational extended preferred sleep cycle duration, wherein the operational extended preferred sleep cycle duration is greater than the existing sleep cycle and is for use in communications in place of the existing sleep cycle duration;
   receiving a paging message; and
   buffering the paging message for a duration based at least in part on the operational sleep cycle duration.

7. The method of claim 6, wherein the first control message comprises a system parameter message.

8. The method of claim 6, wherein the second message comprises a registration message.

9. The method of claim 6, wherein the buffering of the paging message is performed if the paging message arrives before the wireless device wakes up.

10. The method of claim 9, further including:
    sending, when buffering the paging message, an acknowledgement message to indicate the deferred page will be sent later.

11. The method of claim 6, further comprising:
    sending the buffered paging message when it is the time for the wireless device to wake up.

12. A wireless communication apparatus, comprising:
    means for transmitting a first control message comprising a first field indicative of support of an extended sleep cycle duration that is greater than an existing sleep cycle duration;
    means for receiving a second control message comprising a second field indicative of an operational sleep cycle duration, wherein the operational extended preferred sleep cycle duration is greater than the existing sleep cycle and is for use in communications in place of the existing sleep cycle;
    means for receiving a paging message; and
    means for buffering the paging message for a duration based at least in part on the operational sleep cycle duration.

13. The apparatus of claim 12, wherein the means for buffering the paging message buffers the paging messages if the paging message arrives before the wireless device wakes up.

14. The apparatus of claim 13, further including:
    means for sending, when the paging message are buffered, an acknowledgement message to indicate the deferred page will be sent later.

15. The apparatus of claim 12, further comprising:
    means for sending the buffered paging message when it is the time for the wireless device to wake up.

16. A computer program product comprising a non-transitory computer readable, non-volatile medium having instructions stored thereon, the instructions comprising:
    code for transmitting a first control message comprising a first field indicative of support of an extended sleep cycle duration that is greater than an existing sleep cycle duration;
    code for receiving a second control message comprising a second field indicative of an operational sleep cycle duration, wherein the operational extended preferred sleep cycle duration is greater than the existing sleep cycle and is for use in communications in place of the existing sleep cycle;
    code for receiving a paging message; and
    code for buffering the paging message for a duration based at least in part on the operational sleep cycle duration.

17. The computer program product of claim 16, wherein the code for buffering the paging message is performed if the paging message arrives before the wireless device wakes up.

18. The computer program product of claim 17, further including:
    code for sending, when the paging message is buffered, an acknowledgement message to indicate the deferred page will be sent later.

19. The computer program product of claim 16, further including:
    code for sending the buffered paging message when it is the time for the wireless device to wake up.

* * * * *